(12) United States Patent
Fujita

(10) Patent No.: US 12,509,056 B2
(45) Date of Patent: Dec. 30, 2025

(54) HYBRID VEHICLE CONTROL FOR CONTROLLING AN INVERTER TO CANCEL DRAGGING TORQUE

(71) Applicant: TOYOTA JIDOSHA KABUSHIKI KAISHA, Toyota (JP)

(72) Inventor: Kazuya Fujita, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 135 days.

(21) Appl. No.: 18/522,646

(22) Filed: Nov. 29, 2023

(65) Prior Publication Data

US 2024/0182017 A1 Jun. 6, 2024

(30) Foreign Application Priority Data

Dec. 1, 2022 (JP) ................. 2022-192783

(51) Int. Cl.
*B60W 20/40* (2016.01)
*B60K 6/26* (2007.10)
*B60K 6/365* (2007.10)
*B60K 6/40* (2007.10)
*B60W 10/02* (2006.01)
*B60W 10/06* (2006.01)
*B60W 10/08* (2006.01)
(Continued)

(52) U.S. Cl.
CPC ............. *B60W 20/10* (2013.01); *B60K 6/26* (2013.01); *B60K 6/365* (2013.01); *B60K 6/40* (2013.01); *B60W 10/08* (2013.01); *B60W 2510/06* (2013.01); *B60W 2710/083* (2013.01); *B60Y 2200/92* (2013.01)

(58) Field of Classification Search
CPC .. B60W 20/10; B60W 10/08; B60W 2510/06; B60W 2710/083; B60W 20/00; B60W 20/40; B60W 2510/081; B60K 6/26; B60K 6/365; B60K 6/40; B60K 6/445; B60Y 2200/92; Y02T 10/62
See application file for complete search history.

(56) References Cited

U.S. PATENT DOCUMENTS

2018/0222322 A1* 8/2018 Shimizu ................ B60W 10/26
2018/0222329 A1* 8/2018 Shimizu ................ B60W 20/10
(Continued)

FOREIGN PATENT DOCUMENTS

| JP | 2008-174123 A | 7/2008 |
| JP | 2010-208541 A | 9/2010 |
| JP | 2021-065038 A | 4/2021 |

*Primary Examiner* — Brian P Sweeney
(74) *Attorney, Agent, or Firm* — Dinsmore & Shohl LLP

(57) ABSTRACT

A hybrid electric vehicle of this disclosure includes an engine; a first motor; a planetary gear with three rotating elements connected to three axes of the first motor, the engine, and a drive shaft connected to an axle; a second motor connected to the drive shaft; first and second inverters driving the first and second motors; a power storage device connected to the first and second inverters via power lines; and a controller is programmed to controlling the engine and the first and second inverters. The controller is programmed to execute a predetermined control controlling the first inverter to output a torque from the first motor cancelling dragging torque of the first motor when the shift position is changed from a position different from neutral position to the neutral position and the engine is operating.

2 Claims, 3 Drawing Sheets

(51) Int. Cl.
*B60W 20/10* (2016.01)
*B60W 30/18* (2012.01)
*B60W 40/12* (2012.01)
*B60W 50/00* (2006.01)

(56) References Cited

U.S. PATENT DOCUMENTS

2018/0304881 A1* 10/2018 Okabe .................. B60W 20/00
2021/0107362 A1* 4/2021 Osugi ..................... B60L 50/15

* cited by examiner

HYBRID VEHICLE CONTROL FOR CONTROLLING AN INVERTER TO CANCEL DRAGGING TORQUE

CROSS-REFERENCE TO RELATED APPLICATIONS

The present disclosure claims priority to Japanese Patent Application No. 2022-192783 filed Dec. 1, 2022, which is incorporated herein by reference.

TECHNICAL FIELD

The present disclosure relates to a hybrid electric vehicle, and in particular, to a hybrid electric vehicle that include, a first motor, a planetary gear, a second motor, and first and second inverters.

BACKGROUND

A Conventional hybrid electric vehicle of this type has been proposed with an engine, a first motor, a planetary gear, a second motor, first and second inverters, and a transmission (for example, refer to Japanese Patent Laid-Open Publication 2008-174123). The planetary gear has three rotating elements connected to three shafts: the first motor, the engine, and the power shaft (ring gear shaft). The second motor is connected to the power shaft. The First and second inverters drive the first and second motors. The transmission is connected between the power shaft and a drive shaft connected to the axle. In this hybrid electric vehicle, when the engine is idling and a shift position is N position and the connection between the power shaft and the drive shaft is disconnected by the transmission, the engine rotates at idle speed and the rotation speed of the second motor is adjusted. This presses the teeth of the ring gear of the planetary gear against the teeth of the pinion gear, thereby suppressing the generation of gear rattle noise of the planetary gear.

SUMMARY

In the hybrid electric vehicle described above, the transmission disconnects the power shaft from the drive shaft and adjusts the rotation speed of the second motor to suppress the generation of the tooth beating noise of the planetary gear. However, in a hybrid electric vehicle that does not include a transmission and in which the second motor is connected to the drive shaft and the connection between the second motor and the drive shaft cannot be disconnected, the rotation speed of the second motor cannot be freely adjusted. Therefore, it is desirable to adopt a measure other than adjusting the rotation speed of the second motor in order to suppress abnormal noises such as the teeth beating of the planetary gear. Furthermore, during engine operation, abnormal noises such as the gear rattle noise of the planetary gear may occur due to the dragging torque caused by the rotation of the first motor. It is necessary to deal with abnormal noise caused by such dragging torque.

The main purpose of the hybrid electric vehicle of the present disclosure is to suppress the generation of the abnormal noise when the second motor is always connected to the drive shaft.

The hybrid electric vehicle of the present disclosure has adopted the following to achieve the main objectives described above.

A hybrid electric vehicle of this disclosure includes an engine; a first motor; a planetary gear with three rotating elements connected to three axes of the first motor, the engine, and a drive shaft connected to an axle; a second motor connected to the drive shaft; first and second inverters driving the first and second motors; a power storage device connected to the first and second inverters via power lines; and a controller is programmed to control the engine and the first and second inverters. The controller is programmed to execute a predetermined control controlling the first inverter to output a torque from the first motor cancelling dragging torque of the first motor when the shift position is changed from a position different from neutral position to the neutral position and the engine is operating.

In the hybrid electric vehicle of this disclosure, the controller is programmed to execute the predetermined control controlling the first inverter to output the torque from the first motor cancelling the dragging torque of the first motor when the shift position is changed from the position different from the neutral position to the neutral position and the engine is operating. This allows the hybrid electric vehicle to suppress the generation of abnormal noise due to the dragging torque of the first motor caused by executing gate shutdown of the first inverter (turning off all the transistors of the first inverter). This enables to suppress the generation of the abnormal noise when the second motor is always connected to the drive shaft.

DESCRIPTION OF EMBODIMENTS

The following is a description of the embodiment of present disclosure with reference to the drawings.

Figure 1:
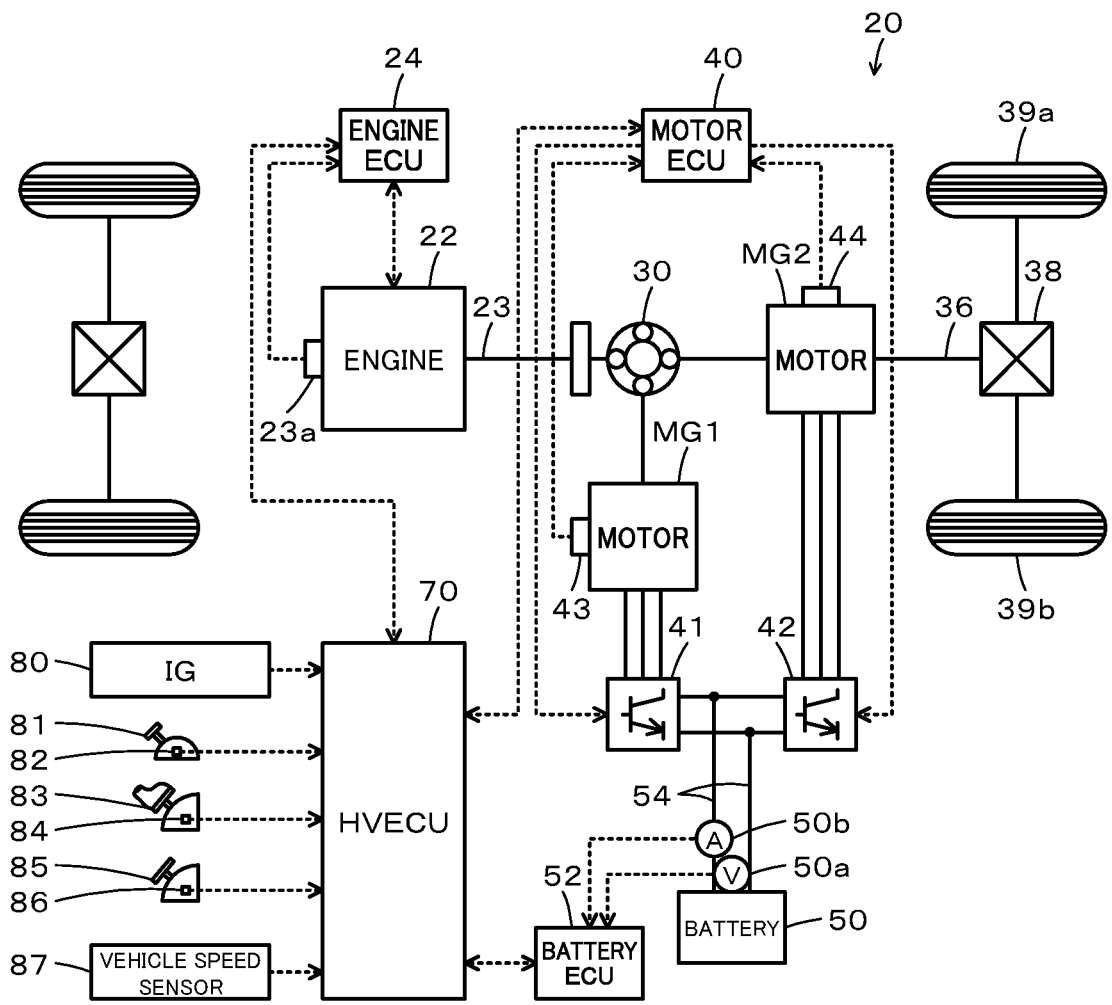
FIG. 1 is a configuration diagram illustrating the schematic configuration of a hybrid electric vehicle 20 according to one embodiment of the disclosure.
Figure 2:
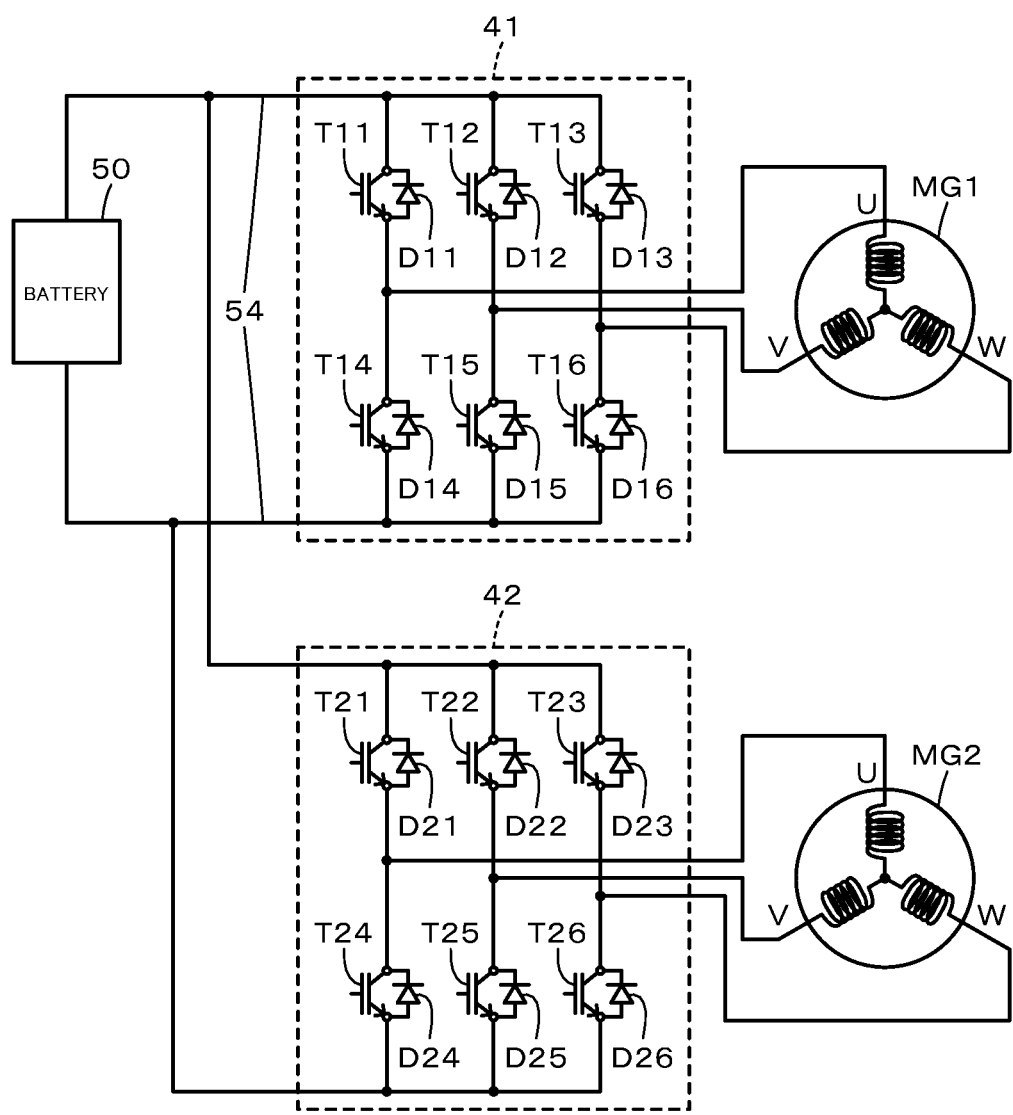
FIG. 2 is a configuration diagram illustrating the schematic configuration of an electric drive system including motors MG1 and MG2.

FIG. 1 is a configuration diagram illustrating the schematic configuration hybrid electric vehicle 20 according to one embodiment of the disclosure. FIG. 2 is a configuration diagram illustrating the schematic configuration of an electric drive system including motors MG1 and MG2. As illustrated, the hybrid electric vehicle 20 of the embodiment includes an engine 22, a planetary gear 30, motors MG1 and MG2 (the first and second motors), inverters 41 and 42 (the first and second inverters), a battery 50, and a hybrid electronic control unit (hereinafter referred to as "HVECU") 70.

The engine 22 is configured as an internal combustion engine to output power using, for example, gasoline or light oil as a fuel. This engine 22 is subjected to operation control by an engine electronic control unit (hereinafter referred to as "engine ECU") 24.

The engine ECU 24 includes a microcomputer with a CPU, a ROM, a RAM, a flash memory, input/output ports and a communication port. Signals from various sensors required for operation control of the engine 22 are input into the engine ECU 24 via the input port. The Signals input to the engine ECU 24 include, for example, a crank angle θcr from a crank position sensor 23*a* configured to detect the rotational position of a crankshaft 23 of the engine 22, a cooling water temperature Tw from a water temperature sensor configured to detect the water temperature. Various control signals for operation control of the engine 22 are output from the engine ECU 24 via the output port. The Signals output from the engine ECU 24 includes, for example, a control signal to a throttle valve, a control signal to fuel injection valves, and control signal to ignition plugs. The engine ECU 24 is connected with the HVECU 70 via the respective communication ports. The engine ECU 24 calculates a rotation speed Ne of the engine 22, based on the crank angle θcr input from the crank position sensor 23*a*.

The planetary gear 30 is configured as a single pinion-type planetary gear mechanism. A sun gear of the planetary gear 30 is connected with a rotor of the motor MG1. A ring gear of the planetary gear 30 is connected with a drive shaft 36 which is coupled with drive wheels 39*a* and 39*b* via a differential gear 38. As described above, a carrier of the planetary gear 30 is connected with the crankshaft 23 of the engine 22.

The motor MG1 is configured as a synchronous motor generator having a rotor with permanent magnets embedded therein and a stator with three-phase coils wound thereon. The motor MG2 is also configured as a synchronous motor generator like the motor MG1 and includes a rotor that is connected with the drive shaft 36.

The inverters 41 and 42 drive motors MG1 and MG2 and are connected with power line 54. As shown in FIG. 2, the inverter 41 includes six transistors T11 to T16 and six diodes D11 to D16 that are connected in parallel to and in a reverse direction to the transistors T11 to T16. The transistors T11 to T16 are arranged in pairs, such that two transistors in each pair respectively serve as a source and a sink relative to a positive electrode line and a negative electrode line of the power lines 54. The respective phases of the three-phase coils (U phase, V phase and W phase) of the motor MG1 are connected with connection points of the respective pairs of the transistors T11 to T16. Accordingly, when a voltage is applied to the inverter 41, a motor electronic control unit (hereinafter referred to as "motor ECU") 40 serves to regulate the rates of ON times of the respective pairs of the transistors T11 to T16, such as to provide a rotating magnetic field in the three-phase coils and thereby rotate and drive the motor MG1. Like the inverter 41, the inverter 42 includes six transistors T21 to T26 and six diodes D21 to D26. When a voltage is applied to the inverter 42, the motor ECU 40 serves to regulate the rates of ON times of the respective pairs of the transistors T21 to T26, such as to provide a rotating magnetic field in the three-phase coils and thereby rotate and drive the motor MG2.

The motor ECU 40 includes a microcomputer with a CPU, a ROM, a RAM, a flash memory, input/output ports and a communication port. Signals from various sensors required for drive control of the motors MG1 and MG2 are input into the motor ECU 40 via the input port. The signals input into the motor ECU 40 include, for example, rotational positions θm1 and θm2 from rotational position detection sensors (for example, a resolver) 43 and 44 configured to detect the rotational positions of the respective rotors of the motors MG1 and MG2, phase currents Iu1, Iv1, Iu2 and Iv2 from current sensors configured to detect electric currents flowing in the respective phases of the motors MG1 and MG2. The control signals for drive control of the motors MG1 and MG2, for example, switching control signals to the transistors T11 to T16 of the inverter 41 and the transistors T21 to T26 of the inverter 42, are output from the motor ECU 40 via the output port. The motor ECU 40 is connected with the HVECU 70 via the respective communication ports. The motor ECU 40 calculates electrical angles θe1 and θe2 and rotation speeds Nm1 and Nm2 of the respective motors MG1 and MG2, based on the rotational positions θm1 and θm2 of the respective rotors of the motors MG1 and MG2 input from the rotational position detection sensors 43 and 44.

The battery 50 is configured as, for example, a lithium ion rechargeable battery or a nickel metal hydride battery and is connected with the inverters 41 and 42 via the power lines 54. This battery 50 is under management of a battery electronic control unit (hereinafter referred to as "battery ECU") 52.

The battery ECU 52 includes a microcomputer with a CPU, a ROM, a RAM, a flash memory, input/output ports and a communication port, although not being illustrated. Signals from various sensors required for management of the battery 50 are input into the battery ECU 52 via the input port. The signals input into the battery ECU 52 include, for example, a voltage Vb of the battery 50 from a voltage sensor 50*a* mounted between terminals of the battery 50, a current Ib of the battery 50 from a current sensor 50*b* mounted to an output terminal of the battery 50. The battery ECU 52 is connected with the HVECU 70 via the respective communication ports. The battery ECU 52 calculates a state of charge SOC, based on an integrated value of the current Ib of the battery 50 from the current sensor 50*b*. The state of charge SOC denotes a ratio of the capacity of electric power dischargeable from the battery 50 to the overall capacity of the battery 50.

The HVECU 70 includes a microcomputer with a CPU, a ROM, a RAM, a flash memory, input/output ports and a communication port, although not being illustrated. Signals from various sensors are input into the HVECU 70 via the input port. The signals input into the HVECU 70 include, for example, an ignition signal from an ignition switch 80 and a shift position SP from a shift position sensor 82 configured to detect an operating position of a shift lever 81. The shift position SP includes a parking position (P position) used for parking, a rearward position (R position) for driving backward, a neutral position (N position), and a forward position (D position) for driving forward. In addition to the shift position SP, the signals input into the HVECU 70 also include an accelerator position Acc from an accelerator pedal position sensor 84 configured to detect a depression amount of an accelerator pedal 83, a brake pedal position BP from a brake pedal position sensor 86 configured to detect a depression amount of a brake pedal 85, and a vehicle speed V from a vehicle speed sensor 87. The HVECU 70 is connected with the engine ECU 24, the motor ECU 40 and the battery ECU 52 via the respective communication ports as described above.

In the hybrid electric vehicle 20 of the embodiment having the configuration described above, the HVECU 70, the engine ECU 24, and the motor ECU 40 basically control the engine 22 and the motors MG1 and MG2 (the inverters 41 and 42) to drive the hybrid electric vehicle 20 in a hybrid electric vehicle mode (HV drive mode) or the electric vehicle mode (EV drive mode). The HV drive mode denotes a drive mode in which the hybrid electric vehicle 20 is driven with operating the engine 22 and driving the motors MG1 and MG2. The EV drive mode denotes a drive mode in which the hybrid electric vehicle 20 is driven with stopping operation of the engine 22 and driving the motor MG2. In HV drive mode and (EV drive mode, the HVECU 70, the engine ECU 24, and the motor ECU 40 control the engine 22 and the motors MG1 and MG2 to run by driving torque Td* based on the accelerator position Acc and vehicle speed V. When required power Pe* of the engine 22 based on the driving torque Td* is sufficiently small, and when the engine 22 is required to warm up or heat the cabin, the HVECU 70, the engine ECU 24 and the motor ECU 40 let the engine 22 idle.

In the hybrid electric vehicle 20 of the embodiment, when the shift position SP is in the N position, gate shutdown of the inverter 42 (all transistors T21 to T26 are turned off) is executed. The control of inverter 41 is described below. In this case, when the engine 22 is operated just before the shift position SP is shifted from a position different from the N position to the N position, idle operation of the engine 22 is executed, and when the engine 22 is stopped, the engine 22 is kept stopped.

Figure 3:
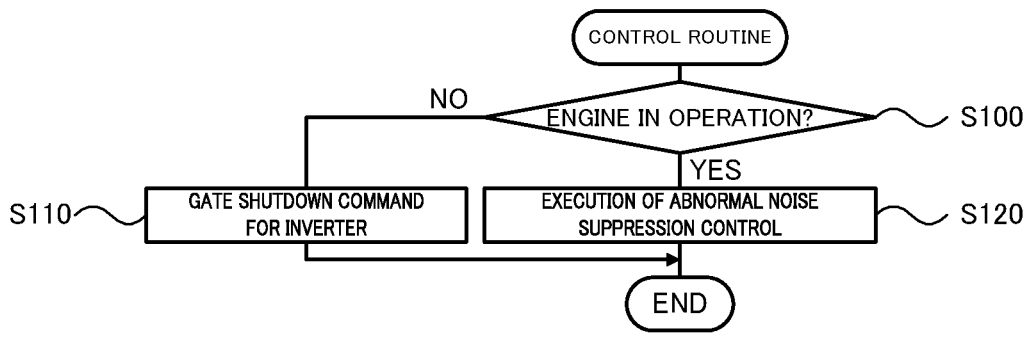
FIG. 3 is a flowchart showing one example of a control routine executed by an HVECU 70 according to the embodiment.

The following describes operations of the hybrid electric vehicle 20 of the embodiment having the above configuration and more specifically operations of controlling the inverter 41 when the shift position SP is operated from a position different from the N position (e.g., P or D position) to the N position. FIG. 3 is a flowchart showing one example of a control routine executed by the HVECU 70. This routine is repeated when the shift position SP is operated from a position different from the N position to the N position.

When this routine is executed, the HVECU 70 first determines whether the engine 22 is in operation (idle operation) (step S100). When the engine 22 is running, the motor MG1 rotates and generates a dragging torque (mechanical loss) Tdrg, and the dragging torque Tdrg may cause abnormal noise such as gear rattle noise in the planetary gear 30. Step S100 is the process of determining whether or not such abnormal noise is likely to occur.

When the engine 22 is in operation in step S100, the motor MG1 rotates and generates the dragging torque (the mechanical loss) Tdrg, and the dragging torque Tdrg may cause relatively loud abnormal noise. In this case, abnormal noise suppression control (prescribed control) is executed (step S120) and this routine is terminated.

Figure 4:
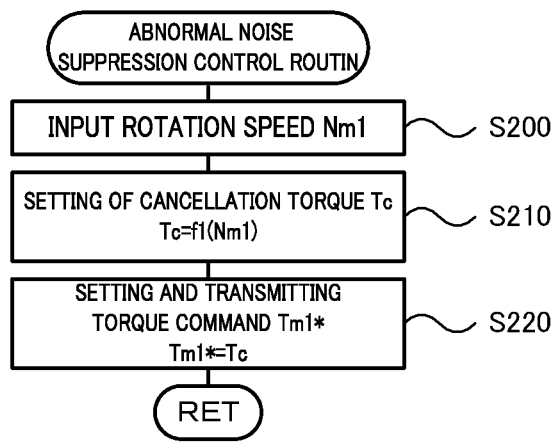
FIG. 4 is a flowchart showing one example of an abnormal noise suppression control routine.

The details of the abnormal noise suppression control in step S120 is explained. FIG. 4 is a flowchart showing one example of the abnormal noise suppression control routine. In abnormal noise suppression control, the rotation speed Nm1 of motor MG1 is first input (step S200). The rotation speed Nm1 is calculated based on the rotational position θm1 of the rotor of motor MG1 from the rotational position detection sensor 43 and input.

Next, the input rotation speed Nm1 of motor MG1 is used to set the cancellation torque Tc cancelling the dragging torque Tdrg of motor MG1 (step S210). The cancellation torque Tc is the same in magnitude as the dragging torque Tdrg of the motor MG1 but opposite in direction. Since the magnitude of the dragging torque Tdrg increases with the absolute value of the rotation speed Nm1 of motor MG1, the magnitude of the cancellation torque Tc increases with the absolute value of the rotation speed Nm1 of motor MG1. To set the cancellation torque Tc, the relationship between the rotation speed Nm1 of the motor MG1 and the cancellation torque Tc is determined in advance as a first map by experiment, analysis, or machine learning, and the cancellation torque Tc corresponding to the rotation speed Nm1 is derived from the first map.

After setting the cancellation torque Tc described above, the set cancellation torque Tc is set to torque command Tm1* of the motor MG1 and the torque command Tm1* is transmitted to the motor ECU 40 (step S220), and the abnormal noise suppression control routine is terminated. The motor ECU 40 receiving the torque command Tm1* controls the inverter 41 to drive the motor MG1 by the torque command Tm1*. The abnormal noise suppression control allows the cancellation torque Tc output from the motor MG1 to cancel the dragging torque Tdrg. This enables to suppress the abnormal noise caused by the dragging torque Tdrg.

When the engine 22 is not in operated in step S100, it is determined that there is no possibility of the abnormal noise, and a gate shutdown command for the inverter 41 is sent to the motor ECU 40 (step S110), and this routine is terminated. The motor ECU 40 receiving the gate shutdown command for the inverter 41 turns off all transistors T11 to T16 of the inverter 41. This enables to reduce power consumption.

Figure 5:
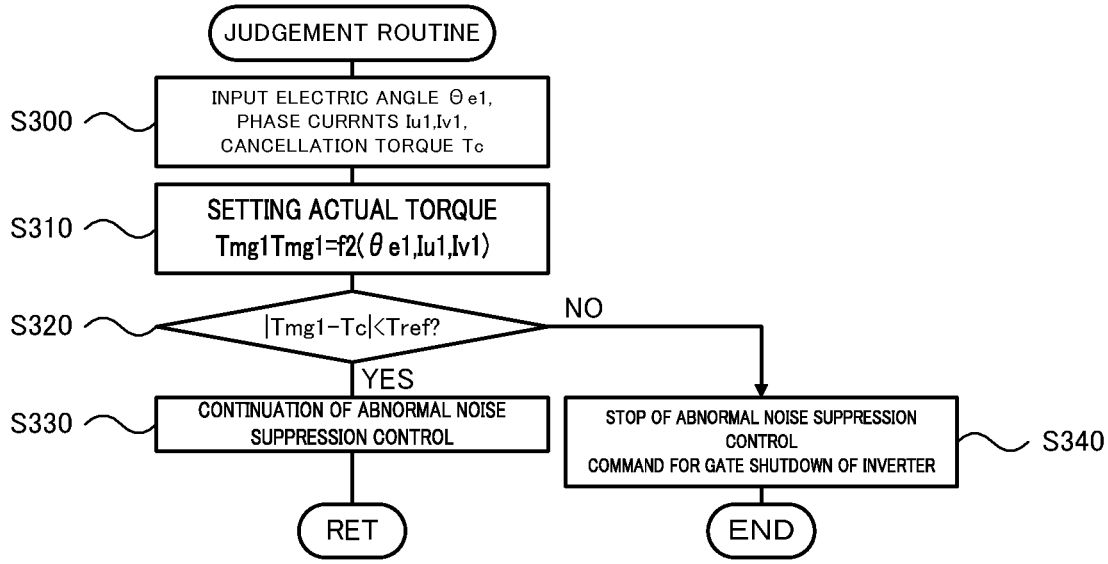
FIG. 5 is a flowchart showing one example of a judgment routine executed by the HVECU 70.

Next, the process of judging whether or not to continue the execution of the abnormal noise suppression control when the abnormal noise suppression control is being executed is described. FIG. 5 is a flowchart showing one example of a judgment routine executed by the HVECU 70. This routine is executed during the execution of the abnormal noise suppression control.

When the judgment routine is executed, the CPU of the HVECU 70 executes the process of inputting an electric angle θe1 of the motor MG1, the phase currents Iu1 and Iv1 flowing in the respective phase of the motor MG1, and the cancellation torque Tc (step S300). The electric angle ee1 calculated based on the rotational position θm1 of the rotor of the motor MG1 from the rotational position detection sensor 43 is input. The phase currents Iu1 and Iv1 are input values detected by the current sensors detecting the phase currents flowing in the respective phase of the motor MG1. The cancellation torque Tc is input as the value set in step S210 of the abnormal noise suppression control routine illustrated in FIG. 4.

Then, using the input electric angle θe1 and the phase currents Iu1 and Iv1, actual torque Tmg1 as torque actually output from the motor MG1 is set (step S310). To set the actual torque Tmg1, the relationship between the rotation speed Nm1, the phase currents Iu1 and Iv1, and the actual torque Tmg1 is obtained in advance as a second map by experiment, analysis, or machine learning, and the actual torque Tmg1 corresponding to the rotation speed Nm1, the phase currents Iu1 and Iv1 is derived from the second map.

Next, it is determined whether absolute value of the value obtained by subtracting the cancellation torque Tc from the actual torque Tmg1 is less than threshold value Tref (step S320). The threshold value Tref is set to torque slightly smaller than torque output from the motor MG1 to the drive shaft 36 via the planetary gear 30.

When the absolute value of the value obtained by subtracting the cancellation torque Tc from the actual torque Tmg1 in step S320 is less than the threshold value Tref, it is determined that the abnormal noise suppression control is to be continued (step S330) because no torque is output from the motor MG1 to the drive shaft 36 via the planetary gear 30, and the judgment routine is terminated.

When the absolute value of the value obtained by subtracting the cancellation torque Tc from the actual torque Tmg1 in step S320 is equal to or higher than the threshold value Tref, it is judged that torque is output from the motor MG1 to the drive shaft 36 via the planetary gear 30, and the abnormal noise suppression control is stopped and the gate shutdown command of the inverter 41 is sent to the motor ECU 40 (step S340), and the judgment routine is terminated. The motor ECU 40 receiving the gate shutdown command for inverter 41 turns off all transistors T11 to T16 of the inverter 41. Thus, by executing gate shutdown of the inverter 41, torque output to the drive shaft 36 can be suppressed.

In the hybrid electric vehicle 20 of the embodiment described above, when the shift position SP is changed from the position different from the N position to the N position and the engine 22 is operating, the noise suppression control controlling the inverter 41 to output the cancellation torque Tc from the motor MG1 cancelling the dragging torque Tdrg of the motor MG1. This enables to suppress the generation of the abnormal noise caused by the dragging torque Tdrg when the motor MG2 is always connected to the drive shaft.

When the shift position SP is changed from a position different from the N position to the N position and the engine 22 is not operating, the gate shutdown of the inverter 41 is executed. This enables to reduce power consumption.

Furthermore, when the abnormal noise suppression control is executed and absolute value of the value obtained by subtracting the cancellation torque Tc from the actual torque Tmg1 is equal to or higher than the threshold value Tref, the abnormal noise suppression control is stopped and gate shutdown of the inverter 41 is executed. This enables to suppress torque output from the motor MG1 to the drive shaft 36 via the planetary gear 30.

In the hybrid electric vehicle 20 of the embodiment, gate shutdown of the inverter 41 is executed in step S110 and step S340. In step S110 and step S340, torque may not be output from the motor MG1. For example, the inverter 41 may be controlled such that d-axis current flows to the motor MG1.

In the embodiment of the hybrid electric vehicle 20, the judgment routine illustrated in FIG. 5 is executed during the execution of the abnormal noise suppression control. The judgment routine illustrated in FIG. 5 may not be executed during the execution of the abnormal noise suppression control.

In the embodiment of the hybrid electric vehicle 20, the hybrid electric vehicle 20 includes the engine ECU 24, the motor ECU 40, the battery ECU 52, and the HVECU 70. The hybrid electric vehicle 20 may configure at least two of these units as a single electronic control unit.

In the hybrid electric vehicle of the present disclosure, the controller may be programmed to execute gate shutdown of the first inverter when the shift position is changed from the position different from the neutral position to the neutral position and the engine is not operating. When the engine is not operating, gate shutdown of the first inverter does not generate dragging torque at the first motor. Gate shutdown of the first inverter enables to suppress power consumption when the engine is not being operated.

In the hybrid electric vehicle of the present disclosure, the controller may be programmed to stop the prescribed control and to execute gate shutdown of the first inverter when the prescribed control is executed and absolute value obtained by subtracting cancellation torque dragging torque of the first motor from torque outputted from the first motor is equal to or higher than threshold value. This enables to suppress torque output from the first motor to the drive shaft via the planetary gear. The threshold value is set to torque slightly smaller than torque output from the motor to the drive shaft via the planetary gear.

The following is an explanation of the correspondence between the main elements of the embodiment and the main elements of the present disclosure described in the Summary section. In the embodiment, engine 22 corresponds to "engine", motor MG1 corresponds to "first motor", planetary gear 30 corresponds to "planetary gear", motor MG2 corresponds to "second motor", inverters 41 and 42 correspond to "first and second inverters", battery 50 corresponds to "power storage device", and motor ECU 40 and HVECU 70 corresponds to "controller".

The correspondence between the major elements of the embodiment and the major elements of the present disclosure described in the Summary section is an example of how the embodiment can be used to specifically explain the embodiment of the present disclosure described in the Summary section. This does not limit the elements of the present disclosure described in the Summary section. In other words, interpretation of the present disclosure described in the Summary section should be based on the description in that section, and the embodiment is only one specific example of the present disclosure described in the Summary section.

The above is a description of the form for implementing this disclosure using the embodiment. However, the present disclosure is not limited in any way to these embodiments, and can of course be implemented in various forms within the scope that does not depart from the gist of the present disclosure.

INDUSTRIAL APPLICABILITY

This disclosure is applicable to the manufacturing industry for hybrid electric vehicles.

The invention claimed is:

1. A hybrid electric vehicle comprising:
an engine;
a first motor,
a planetary gear with three rotating elements connected to three axes of the first motor, the engine, and a drive shaft connected to an axle;
a second motor connected to the drive shaft;
first and second inverters driving the first and second motors;
a power storage device connected to the first and second inverters via power lines; and
a controller is programmed to control the engine and the first and second inverters,
wherein the controller is programmed to execute a predetermined control controlling the first inverter to output a torque from the first motor cancelling dragging torque of the first motor when the shift position is changed from a position different from neutral position to the neutral position and the engine is operating, and
wherein the controller is programmed to stop the prescribed control and to execute gate shutdown of the first inverter when the prescribed control is executed and an absolute value obtained by subtracting cancellation torque dragging torque of the first motor from torque outputted from the first motor is equal to or higher than threshold value.

2. The hybrid electric vehicle according to claim 1,
wherein the controller is programmed to execute gate shutdown of the first inverter when the shift position is changed from the position different from the neutral position to the neutral position and the engine is not operating.

* * * * *